United States Patent
Lee

(10) Patent No.: US 9,367,445 B2
(45) Date of Patent: Jun. 14, 2016

(54) DATA PROCESSING APPARATUS, METHOD FOR PROCESSING DATA, AND COMPUTER READABLE RECORDING MEDIUM RECORDED WITH PROGRAM TO PERFORM THE METHOD

(71) Applicant: SAMSUNG ELECTRONICS CO., LTD., Suwon-si, Gyeonggi-do (KR)

(72) Inventor: Kwang-ho Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 177 days.

(21) Appl. No.: 13/953,014

(22) Filed: Jul. 29, 2013

(65) Prior Publication Data

US 2014/0068156 A1 Mar. 6, 2014

(30) Foreign Application Priority Data

Aug. 31, 2012 (KR) .......................... 10-2012-0096332

(51) Int. Cl.
*G06F 12/00* (2006.01)
*G06F 12/02* (2006.01)
*G06F 3/06* (2006.01)
*G06F 12/08* (2016.01)

(52) U.S. Cl.
CPC ............ *G06F 12/0246* (2013.01); *G06F 3/061* (2013.01); *G06F 3/0641* (2013.01); *G06F 3/0676* (2013.01); *G06F 3/0679* (2013.01); *G06F 12/0866* (2013.01); *G06F 3/0656* (2013.01)

(58) Field of Classification Search
CPC ..... G06F 3/061; G06F 3/0641; G06F 3/0656; G06F 3/0676; G06F 3/0679; G06F 12/0246; G06F 12/0866
USPC .................................................. 711/103, 113
See application file for complete search history.

(56) References Cited

U.S. PATENT DOCUMENTS

| 2006/0010151 | A1  | 1/2006  | Star Sung |
| 2006/0206668 | A1* | 9/2006  | Uwatoko ............ G06F 12/0802 711/118 |
| 2007/0016693 | A1  | 1/2007  | Goodrich |
| 2009/0282064 | A1  | 11/2009 | Raju et al. |
| 2012/0203955 | A1* | 8/2012  | Kim et al. ...................... 711/103 |

FOREIGN PATENT DOCUMENTS

| JP | 2010-86321   | 4/2010 |
| KR | 1999-006296  | 1/1999 |
| KR | 2001-0076910 | 8/2001 |

* cited by examiner

*Primary Examiner* — Jasmine Song
(74) *Attorney, Agent, or Firm* — Staas & Halsey LLP

(57) ABSTRACT

A data processing apparatus includes a first storage device which stores compressed data therein, a second storage device which accesses and temporarily stores the compressed data stored in the first storage device, a data decompressor which generates decompressed data by decompressing the compressed data and outputs the decompressed data to the second storage device so that the decompressed data is temporarily stored in the second storage device, and a controller which accesses the decompressed data temporarily stored in the second storage device. The data decompressor directly scatters the decompressed data into a page cache based on addresses of the page cache. Accordingly, the operating speed of the program and the data processing apparatus can be improved.

15 Claims, 5 Drawing Sheets

DATA PROCESSING APPARATUS, METHOD FOR PROCESSING DATA, AND COMPUTER READABLE RECORDING MEDIUM RECORDED WITH PROGRAM TO PERFORM THE METHOD

CROSS-REFERENCE TO RELATED APPLICATIONS

This application claims priority under 35 U.S.C. §119(a) to Korean Patent Application No. 10-2012-0096332 filed on Aug. 31, 2012, in the Korean Intellectual Property Office, the disclosure of which is incorporated herein by reference.

BACKGROUND

1. Field

The disclosure herein relates to a data processing apparatus, a method for processing data, and a computer readable recording medium recorded with a program to perform the method, and more particularly to a data processing apparatus, which can efficiently decompress compressed data stored in a first storage device and store the decompressed data in a second storage device, a method for processing data, and a computer readable recording medium recorded with a program to perform the method.

2. Description of the Related Art

In a virtual memory and demand page type operating system (for example, Linux, MS Windows, or the like), execution codes and data (for example, picture pixels for a user interface or font data) are stored in a first storage device in a compressed form. If the execution codes and data are demanded according to a user command, the compressed data that is stored in the first storage device is decompressed and stored in a second storage device, and a central processing unit (CPU) performs a job according to the user command by accessing the decompressed data stored in the second storage device.

In particular, a method for decompressing compressed data in the related art will be described with reference to FIG. 1. FIG. 1 is a diagram illustrating the software configuration for processing data in the related art.

In the related art, in order for a CPU (not illustrated) of a data processing apparatus to access data for performing a job commanded by a user, the CPU loads the compressed data stored in a storage driver 16 into a buffer head 18. The buffer head 18 transmits the compressed data to a SW decompressor 19 to decompress the compressed data. Then, the SW decompressor 19 decompresses the compressed data under the control of the CPU and outputs decompressed data to a middle buffer 20, and the middle buffer 20 copies the decompressed data into a page cache 17. The CPU can access data for performing the job commanded by the user by accessing the decompressed data stored in the page cache 17. The data processing apparatus may further include a user application 11 which may include an application to receive an input, a virtual file system 12 and a page fault handler 13 which may be used for communication with the page cache 17. The data processing apparatus may further include a block layer 15.

That is, in the related art, until the compressed data is decompressed in an uncompressed form and a data processing apparatus can use the decompressed data, an operation to load the compressed data from the storage driver 16 to the buffer head 18, an operation to output the decompressed data from the buffer head 18 to the middle buffer 20, and an operation to copy the decompressed data from the middle buffer 20 to the page cache 17 are performed in order. As a result, in order to store the data in the page cache 17 from which the data processing apparatus can finally use the data, data movement is performed three times in total.

Such data movement may exert an influence on the system performance, that is, a program operating speed that a user feels. Further, in order for the CPU to decompress the data and access the decompressed data, it is necessary to input the data to a cache provided between the storage device and the CPU so that the compressed data and the decompressed data can be accessed by the CPU, and this causes the occurrence of unnecessary operations and costs.

SUMMARY

Additional aspects and/or advantages will be set forth in part in the description which follows and, in part, will be apparent from the description, or may be learned by practice of the invention.

The present disclosure has been made to address at least the above problems and/or disadvantages and to provide at least the advantages described below. Accordingly, an aspect of the present disclosure provides a data processing apparatus and a method for processing data, which can improve the operating speed of a program and the data processing apparatus by simplifying data decompression and storage procedures through providing a separate data decompressor.

According to one aspect of the present disclosure, a data processing apparatus includes a first storage device storing compressed data therein; a second storage device accessing and temporarily storing the compressed data stored in the first storage device; a data decompressor generating decompressed data by decompressing the compressed data and outputting the decompressed data to the second storage device so that the decompressed data is temporarily stored in the second storage device; and a controller accessing the decompressed data temporarily stored in the second storage device.

The second storage device may include an input buffer temporarily storing the compressed data, and a page cache temporarily storing the decompressed data.

The second storage device may temporarily store the compressed data input from the first storage device in the input buffer and then output the compressed data to the data decompressor, and the data decompressor may decompress the compressed data and directly scatter the decompressed data into the page cache.

The second storage device may access the compressed data stored in the first storage device using a DMA (Direct Memory Access) method. The second storage device may access the compressed data stored in the first storage device using the DMA method independently of the controller.

The first storage device may be a hard disc or a flash memory, and the second storage device may be a RAM (Random Access Memory). The first storage device may include a non-volatile memory and the second storage device may include a volatile memory.

The data decompressor and the controller may be implemented by different hardware configurations.

The data decompressor may perform decompression using at least one algorithm from among LZ777 (Lempel-Ziv 77), DEFLATE, LZW (Lempel-Ziv Welch), and LZMA (Lempel-Ziv-Markov chain algorithm).

The data decompressor may directly output the decompressed data to the page cache without transmitting the decompressed data to the input buffer.

According to another aspect of the present disclosure, a method for processing data includes accessing compressed data stored in a first storage device and temporarily storing the compressed data in a second storage device; decompressing the compressed data and generating decompressed data; outputting the decompressed data to the second storage device so that the decompressed data is temporarily stored in the second storage device; and accessing the decompressed data temporarily stored in the second storage device.

The second storage device may include an input buffer temporarily storing the compressed data, and a page cache temporarily storing the decompressed data.

The temporarily storing the compressed data may include temporarily storing the compressed data input from the first storage device in the input buffer and then outputting the compressed data to the data decompressor, wherein the outputting the decompressed data includes the data decompressor directly scattering the decompressed data into the page cache based on addresses of the page cache.

The temporarily storing may include the second storage device accessing the compressed data stored in the first storage device using a DMA (Direct Memory Access) method. The second storage device may access the compressed data stored in the first storage device using the DMA method independently of a controller used to access the decompressed data temporarily stored in the second storage device.

The first storage device may be a hard disc or a flash memory, and the second storage device may be a RAM (Random Access Memory). The first storage device may include a non-volatile memory and the second storage device may include a volatile memory.

The data decompressor and the controller may be implemented by different hardware configurations.

The decompressing may be performed using at least one algorithm from among LZ777 (Lempel-Ziv 77), DEFLATE, LZW (Lempel-Ziv Welch), and LZMA (Lempel-Ziv-Markov chain algorithm).

The decompressing may be performed by directly outputting the decompressed data to the page cache without transmitting the decompressed data to the input buffer.

According to still another aspect of the present disclosure, a non-transitory computer readable recording medium may be recorded with a program to perform a method for processing data, wherein the method for processing data includes accessing compressed data stored in a first storage device and temporarily storing the compressed data in a second storage device; decompressing the compressed data and generating decompressed data; outputting the decompressed data to the second storage device so that the decompressed data is temporarily stored in the second storage device; and accessing the decompressed data temporarily stored in the second storage device.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION

Figure 1:
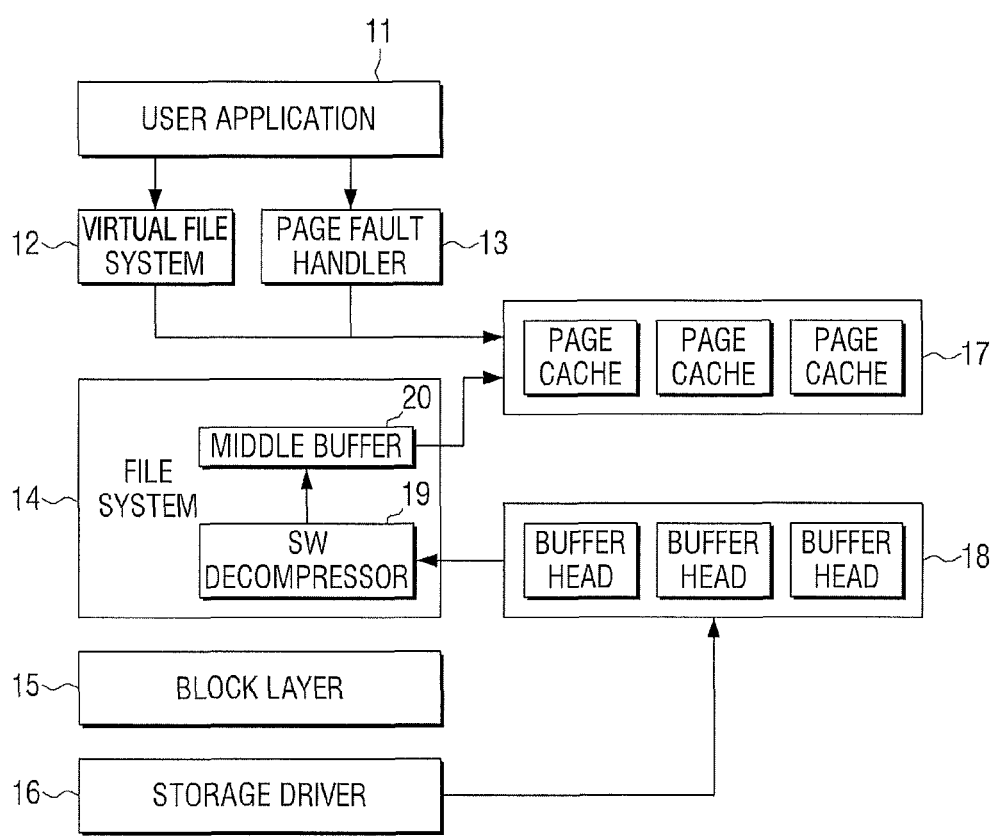
FIG. 1 is a diagram illustrating the software configuration to process data in the related art.

Hereinafter, embodiments of the present disclosure are described in detail with reference to the accompanying drawings, wherein the same drawing reference numerals are used for the same elements even in different drawings. The matters disclosed herein, such as the detailed construction and elements, are provided to assist in a comprehensive understanding of the exemplary embodiments. Well-known functions or constructions are not described in detail since they would obscure the exemplary embodiments with unnecessary detail.

Figure 2:
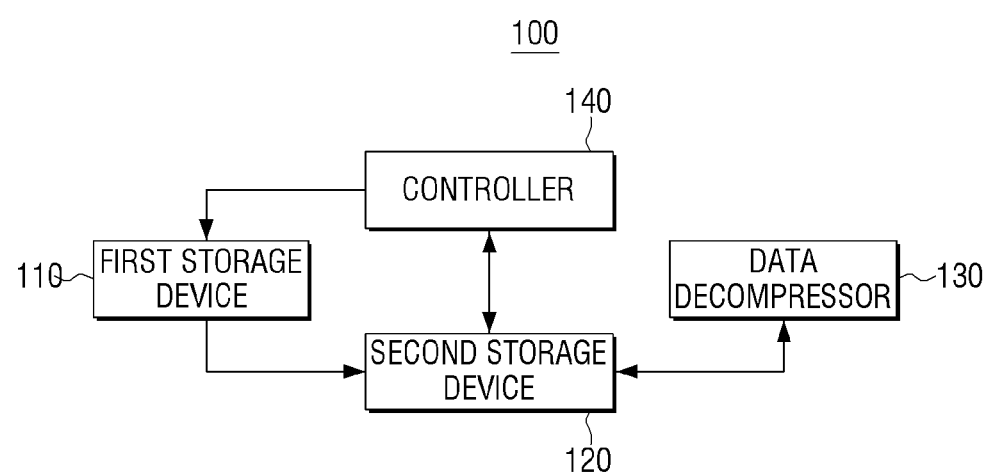
FIG. 2 is a block diagram illustrating the configuration of a data processing apparatus according to an embodiment of the present disclosure.

FIG. 2 is a block diagram illustrating the configuration of a data processing apparatus according to an embodiment of the present disclosure. As illustrated in FIG. 2, a data processing apparatus 100 includes a first storage device 110, a second storage device 120, a data decompressor 130, and a controller 140.

Although the data processing apparatus 100 may be implemented by a desktop PC, this is merely one example, and the data processing apparatus 100 may be implemented by various devices, such as a tablet PC, a notebook PC, a smart phone, a smart TV, and the like.

The first storage device 110 stores data of various programs to drive the data processing apparatus. For example, the first storage device 110 stores execution codes and execution data (for example, picture pixels for a user interface, font data, and the like) in a compressed form. Hereinafter, the execution codes and the execution data are commonly called "data".

The first storage device 110 may be implemented by a hard disc. However, this is merely exemplary, and the first storage device 110 may be implemented by another nonvolatile memory. For example, the first storage device 110 may be embodied as a non-transitory computer readable medium, including floppy disks, flash memory or memory cards (e.g., a USB drive), a ROM, a blue-ray disk, or optical media such as CD ROM discs and DVDs.

The second storage device 120 accesses and temporarily stores compressed data stored in the first storage device 110 so that the controller 140 can perform a job that corresponds to a user command using the data. For example, if the data processing apparatus 100 is booted, the second storage device 120 may access and temporarily store the compressed data for the operating system stored in the first storage device 110.

In particular, the second storage device 120 may include an input buffer temporarily storing the compressed data, and a page cache temporarily storing the decompressed data.

For example, the second storage device 120 may access the compressed data stored in the first storage device 110 and temporarily store the compressed data in the input buffer. At this time, the second storage device 120 may access the compressed data in a DMA (Direct Memory Access) method without passing through the controller 140.

The second storage device 120 may output the compressed data temporarily stored in the second storage device 120 to the data decompressor 130, so that the data decompressor 130 decompresses the compressed data and the controller 140 can use the decompressed data.

The second storage device 120 may receive the decompressed data from the data decompressor 130 and store the decompressed data in the page cache so that the controller 140 can access the decompressed data.

On the other hand, the second storage device 120 may be implemented by a volatile memory (for example, a DRAM (Dynamic Random Access Memory) or a SRAM (Static Random Access Memory)). However, these are merely examples, and the second storage device 120 may also be implemented by other volatile memories.

The data decompressor 130 accesses and decompresses the compressed data stored in the second storage device 120. For example, the data decompressor 130 may access and decompress the compressed data stored in the input buffer of the second storage device 120, and then output the decompressed data to the page cache of the second storage device 120. At this time, the data decompressor 130 may directly scatter the decompressed data into a plurality of page caches based on addresses of the plurality of page caches.

That is, the middle buffer does not copy the decompressed data into the page caches one by one as in the related art, but the data decompressor 130 scatters the decompressed data into the page caches, and thus the number of copies can be reduced to further improve the performance.

The data decompressor 130 can perform the decompression operation with respect to the compressed data using various algorithms, such as LZ777 (Lempel-Ziv 77), DEFLATE, LZW (Lempel-Ziv Welch), and LZMA (Lempel-Ziv-Markov chain algorithm).

The controller 140 controls the overall operation of the data processing apparatus 100 according to a user command. In particular, if the user command is input, the controller 140 may access the decompressed data stored in the page cache of the second storage device 120 to perform a job that corresponds to the user command.

The controller 140 may be implemented by a CPU (Central Processing Unit). However, this is merely exemplary, and the controller 140 may be implemented by another controller.

In particular, the data decompressor 130 and the controller according to an embodiment of the present invention may be implemented by different hardware configurations.

According to the data processing apparatus 100 as described above, the data decompressor 130 that is provided separately from the controller 140 is used to simplify the data decompression and storage processes, and thus the operating speed of the program and the data processing apparatus can be improved.

Figure 3:
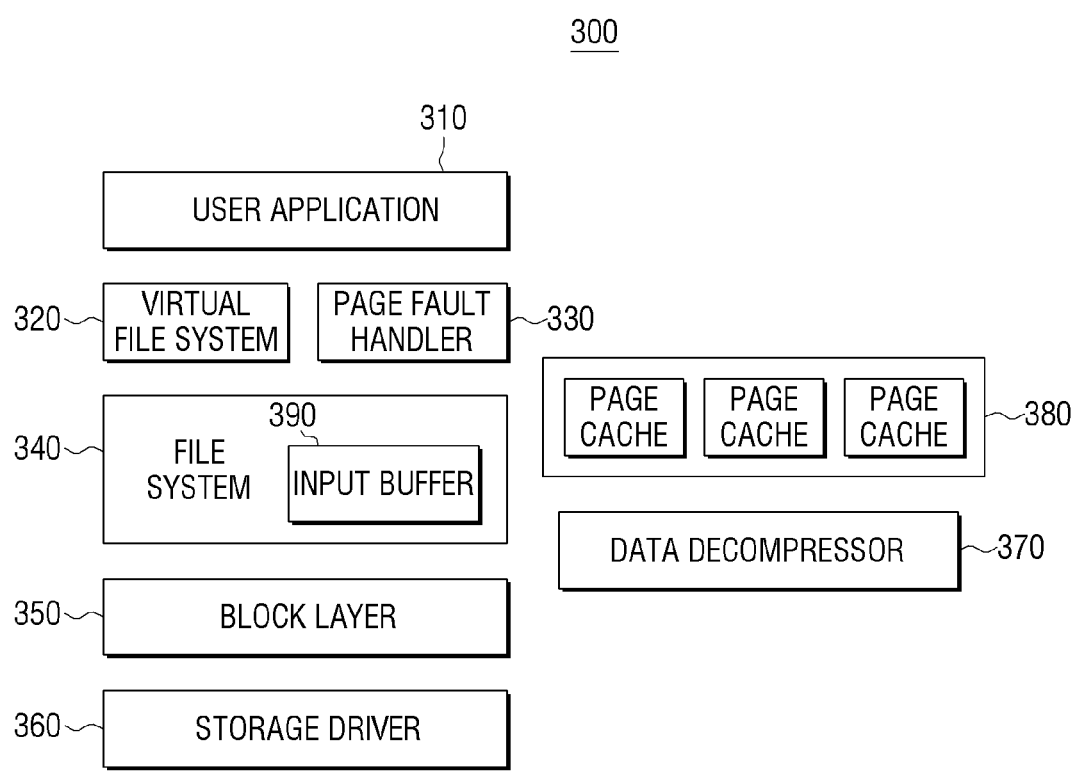
FIG. 3 is a diagram illustrating the software configuration to process data according to an embodiment of the present disclosure.

FIG. 3 is a diagram illustrating the software configuration to process data according to an embodiment of the present disclosure. As illustrated in FIG. 3, a software configuration 300 includes a user application 310, a virtual file system (VFS) 320, a page fault handler 330, a file system 340, a block layer 350, a storage driver 360, a data decompressor 370, and a page cache 380. The file system 340 includes an input buffer 390.

The user application 310 is an application program composed of execution codes whereby functions that the user desires to perform are implemented.

In order for the operating system to generally support various file systems 340, the virtual file system 320 specifies an interface which is unified with the common contents that are required for file management.

The page fault handler 330 operates to store an execution code in the memory only when the corresponding execution code is necessary in the virtual memory and demand page type operating system.

The file system 340 includes position and management information so that the user application 310 can read the execution code or data, which is requested by the user application 310 through the virtual file system 320 or the page fault handler 330, from the storage device (for example, the first storage device 110), and transmits a data input and/or output request to the block layer 350.

In particular, the file system 340 may include an input buffer 390. The input buffer 390 indicates an area in which the storage driver 360 temporarily stores the data that is accessed from the corresponding area of the storage device.

The block layer 350 takes charge of operation information and management of the storage device to efficiently manage input and/or output requests from the several file systems 340.

The storage driver 360 performs physical operations according to the actually used storage device. In particular, the storage driver 360 may operate the data stored in the storage device in accordance with the data input and/or output request input from the block layer 350.

The data decompressor 370 accesses and decompresses the compressed data stored in the input buffer 390, and directly stores the decompressed data in the page cache 380. That is, in contrast to the configuration of FIG. 1, where SW decompressor 19 decompresses the compressed data and outputs decompressed data to a middle buffer 20, the data decompressor 370 transmits the decompressed data to the page cache 380 without transmitting the decompressed data to a middle buffer. That is, there is not an additional transmission of data required from the middle buffer to the page cache as in the configuration FIG. 1.

The page cache 380 refers to a system storage area in which the data is to be finally stored. In this case, the data stored in the page cache 380 may be data in the decompressed form so that the controller 140 can use the data. By storing the data, which has been stored in the storage device having a relatively low input and/or output speed, in the page cache having fast input and/or output speed, the controller can access the data for performing the job requested from the user more rapidly.

Figure 4:
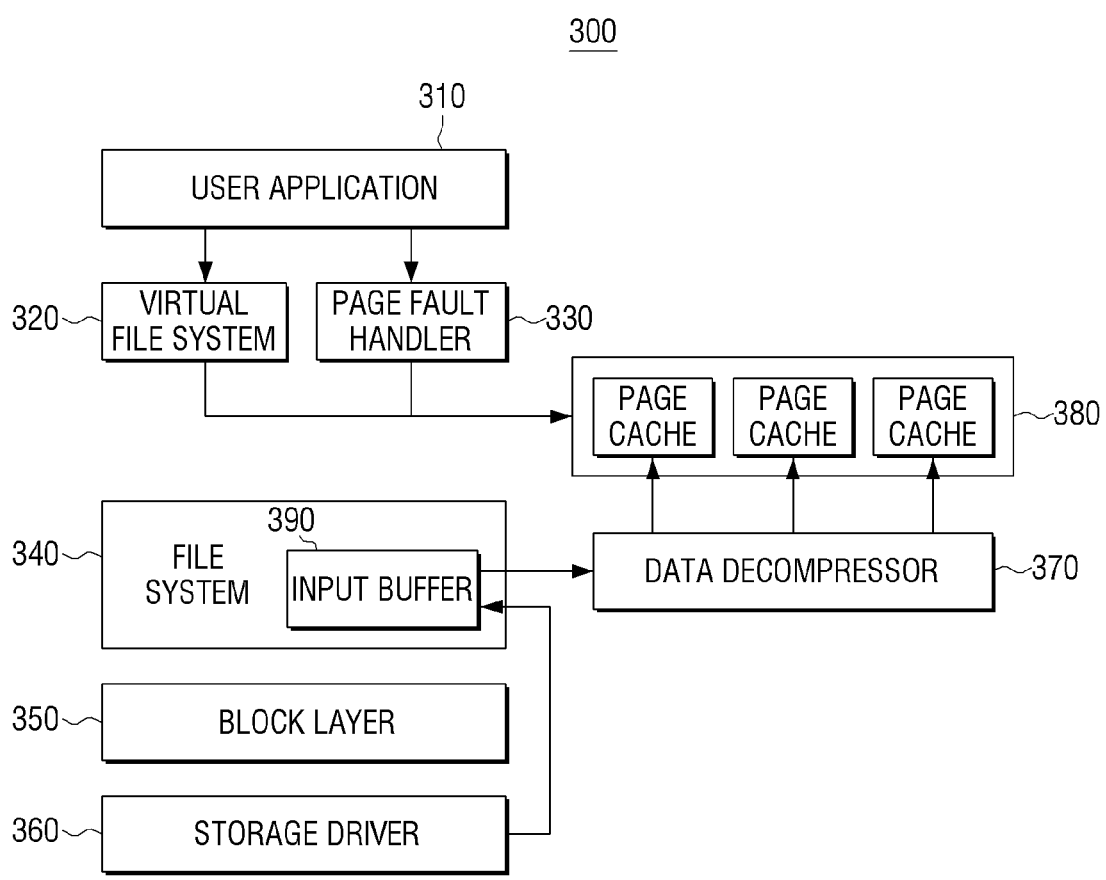
FIG. 4 is a diagram illustrating a process of decompressing compressed data in the software configuration to process data according to an embodiment of the present disclosure.

FIG. 4 is a diagram illustrating a process of decompressing compressed data in the software configuration to process data according to an embodiment of the present disclosure.

If a user application program is operated, the user application 310 requests input and/or output of the execution code from the file system 340 through the page fault handler 330. Further, the user application 310 requests the input and/or output of the execution data from the file system 340 through the virtual file system 320.

If the input and/or output of the execution code and execution data is requested, the file system 340 requests an actual physical input and/or output from the block layer 350 and the storage driver 360 based on the storage area information managed by the file system 340. At this time, the file system 340 may also output information on the area where the data, of which the input and/or output is requested, is stored.

The storage driver 360 stores the compressed data that corresponds to the user application in the input buffer 390 according to the request from the file system 340.

The data decompressor 370 accesses and decompresses the compressed data stored in the input buffer 390. At this time, the data decompressor 370 may directly scatter the decompressed data into the respective page caches 380 based on the addresses of the page caches 380 input from the file system 340.

If the decompressed data is stored in the respective page caches 380, the controller 140 can perform the job that corresponds to the user command by accessing the decompressed data stored in the page cache 380.

As illustrated in FIG. 1, in the related art, the data is finally stored in the page caches through several accessing processes. However, according to an embodiment of the present disclosure, as illustrated in FIG. 4, the data can be finally stored in the page cache through the simplified accessing process.

Figure 5:
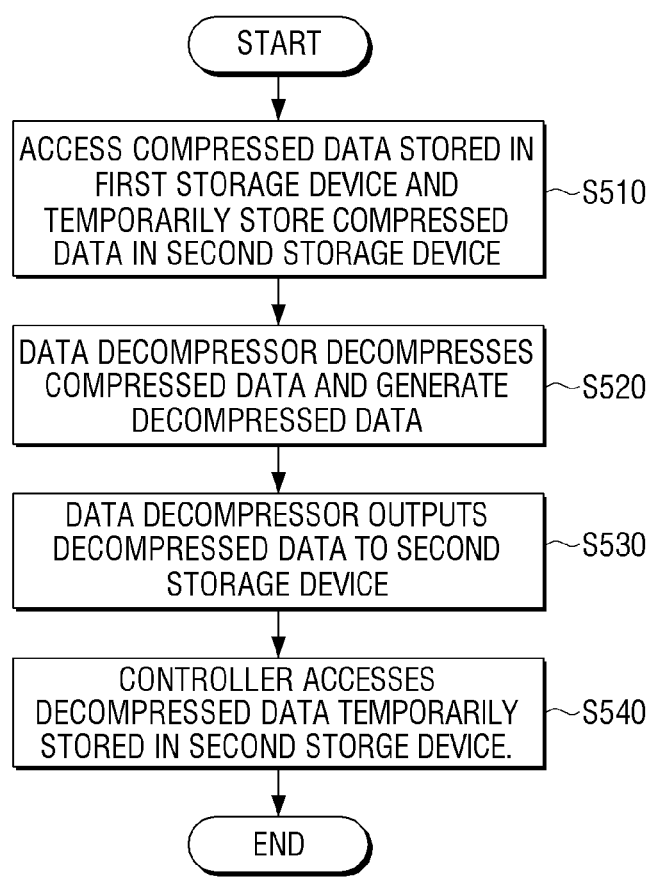
FIG. 5 is a diagram illustrating a method for processing data performed by the data processing apparatus according to an embodiment of the present disclosure.

FIG. 5 is a diagram illustrating a method for processing data performed by the data processing apparatus according to an embodiment of the present disclosure.

First, the second storage device 120 accesses the compressed data stored in the first storage device 110 and temporarily stores the accessed compressed data (S510). At this time, the second storage device 120 may access the compressed data stored in the first storage device 110 in the DMA method separately from the controller 140. In particular, the compressed data may be temporarily stored in the input buffer of the first storage device 110.

According to an embodiment of the present disclosure, the first storage device 110 may be implemented by a nonvolatile memory such as a hard disc, and the second storage device 120 may be implemented by a volatile memory, such as a DRAM or a SRAM.

The data decompressor 130 decompresses the compressed data and generates the decompressed data (S520). For example, the data decompressor 130 may access the compressed data stored in the input buffer of the second storage device 120. Further, the data decompressor 130 may perform the decompression operation with respect to the compressed data using various algorithms, such as LZ777 (Lempel-Ziv 77), DEFLATE, LZW (Lempel-Ziv Welch), and LZMA (Lempel-Ziv-Markov chain algorithm).

Then, the data decompressor 130 outputs the decompressed data to the second storage device 120 (S530). At this time, the data decompressor 130 may store the decompressed data in the page cache of the second storage device 120.

The controller 140 accesses the decompressed data temporarily stored in the second storage device 120 (S540). For example, in order to perform the job that corresponds to the user command, the controller 140 may access the decompressed data temporarily stored in the second storage device 120 that corresponds to the user command.

According to the method for processing data as described above, the data processing apparatus 100 can improve the operating speed of the program and the data processing apparatus.

Program codes for performing the method for processing data according to various embodiments as described above may be stored in a non-transitory computer readable medium and may include program instructions to implement various operations embodied by a central processing unit (CPU). The non-transitory computer readable medium refers to a device-readable medium which does not store data for a short time, such as a register, a cache, and a memory, but semi-permanently stores the data. For example, the above-described various applications or programs may be provided and stored in a non-transitory computer readable medium, such as a CD, a DVD, a hard disc, a Blu-ray disc, a USB, a memory card, and a ROM. Other examples of non-transitory computer-readable media may include magnetic media such as floppy disks, and magnetic tape; magneto-optical media such as optical discs; and hardware devices that are specially configured to store and perform program instructions, such as random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

The components constituting the data processing apparatus and corresponding methods for controlling the data processing apparatus according to the above-described example embodiments, may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but is not limited to, a software or hardware component, circuit, or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While the present disclosure has been shown and described with reference to certain example embodiments thereof, it will be understood by those skilled in the art that various changes in form and detail may be made therein without departing from the spirit and scope of the present disclosure, as defined by the appended claims.

What is claimed is:
1. A data processing apparatus comprising:
a first storage device to store compressed data;
a second storage device comprising an input buffer to temporarily store the compressed data and a page cache;
a data decompressor to generate decompressed data by decompressing the compressed data stored in the input buffer and outputting the decompressed data to the page cache which temporarily stores the decompressed data; and
a controller to access the decompressed data temporarily stored in the page cache,
wherein the data decompressor outputs the decompressed data to the page cache based on an address of the page cache received from the controller,
wherein the second storage device accesses the compressed data stored in the first storage device using a Direct Memory Access (DMA) method, and
wherein the data decompressor and the controller are implemented by different hardware.

2. The data processing apparatus as claimed in claim 1, wherein the second storage device temporarily stores the compressed data input from the first storage device in the input buffer and then outputs the compressed data to the data decompressor, and
the data decompressor decompresses the compressed data and directly scatters the decompressed data into the page cache.

3. The data processing apparatus as claimed in claim 1, wherein the first storage device includes a hard disc or a flash memory, and the second storage device includes a RAM (Random Access Memory).

4. The data processing apparatus as claimed in claim 1, wherein the data decompressor performs decompression using at least one algorithm from among LZ777 (Lempel-Ziv 77), DEFLATE, LZW (Lempel-Ziv Welch), and LZMA (Lempel-Ziv-Markov chain algorithm).

5. The data processing apparatus as claimed in claim 1, wherein the data decompressor directly outputs the decompressed data to the page cache without transmitting the decompressed data to the input buffer.

6. The data processing apparatus as claimed in claim 1, wherein the second storage device accesses the compressed data stored in the first storage device using the DMA method independently of the controller.

7. A method for processing data comprising:
  accessing compressed data stored in a first storage device and temporarily storing the compressed data in an input buffer of a second storage device;
  decompressing the compressed data stored in the input buffer and generating decompressed data;
  outputting the decompressed data to a page cache of the second storage device based on an address of the page cache received from a controller, and temporarily storing the decompressed data in the page cache; and
  accessing the decompressed data temporarily stored in the page cache,
  wherein
  the temporarily storing the compressed data comprises the second storage device accessing the compressed data stored in the first storage device using a DMA (Direct Memory Access) method, and
  the controller and a data decompressor used to decompress the compressed data and generate the decompressed data, are implemented by different hardware.

8. The method for processing data as claimed in claim 7, wherein the temporarily storing the compressed data further comprises temporarily storing the compressed data input from the first storage device in the input buffer and then outputting the compressed data to a data decompressor,
  wherein the outputting the decompressed data includes the data decompressor directly scattering the decompressed data into the page cache based on addresses of the page cache.

9. The method for processing data as claimed in claim 7, wherein the first storage device includes a hard disc or a flash memory, and the second storage device includes a RAM (Random Access Memory).

10. The method for processing data as claimed in claim 7, wherein the controller accesses the decompressed data temporarily stored in the page cache.

11. The method for processing data as claimed in claim 7, wherein the decompressing is performed using at least one algorithm from among LZ777 (Lempel-Ziv 77), DEFLATE, LZW (Lempel-Ziv Welch), and LZMA (Lempel-Ziv-Markov chain algorithm).

12. The method for processing data as claimed in claim 7, wherein decompressing is performed by directly outputting the decompressed data to the page cache without transmitting the decompressed data to the input buffer.

13. The method for processing data as claimed in claim 7, wherein the second storage device accesses the compressed data stored in the first storage device using the DMA method independently of the controller used to access the decompressed data temporarily stored in the second storage device.

14. A non-transitory computer readable recording medium recorded with a program to perform a method for processing data, wherein the method for processing data comprises:
  accessing compressed data stored in a first storage device and temporarily storing the compressed data in an input buffer of a second storage device;
  decompressing the compressed data stored in the input buffer and generating decompressed data;
  outputting the decompressed data to a page cache of the second storage device based on an address of the page cache received from a controller, and temporarily storing the decompressed data in the page cache; and
  accessing the decompressed data temporarily stored in the page cache,
  wherein
  the temporarily storing the compressed data comprises the second storage device accessing the compressed data stored in the first storage device using a DMA (Direct Memory Access) method, and
  the controller and a data decompressor used to decompress the compressed data and generate the decompressed data, are implemented by different hardware.

15. The non-transitory computer readable recording medium of claim 14, wherein the first storage device includes a non-volatile memory and the second storage device includes a volatile memory.

* * * * *